US005842939A

United States Patent [19]
Pui et al.

[11] Patent Number: 5,842,939
[45] Date of Patent: Dec. 1, 1998

[54] PORTABLE SPORTING GOAL FRAMEWORK AND NET

[75] Inventors: Alex Pui, Vancouver; Ed Person, Coquitlum, both of Canada

[73] Assignee: ACT Labs Ltd., Richmond, Canada

[21] Appl. No.: 863,742

[22] Filed: May 27, 1997

[51] Int. Cl.⁶ ..................................................... A63B 63/00
[52] U.S. Cl. .......................................... 473/478; 273/400
[58] Field of Search .................................... 473/476, 478; 273/398, 400, DIG. 30; 403/350

[56] References Cited

U.S. PATENT DOCUMENTS

| | | | |
|---|---|---|---|
| 3,642,282 | 2/1972 | Frischman | 273/127 R |
| 3,698,715 | 10/1972 | Browning et al. | 273/127 B |
| 4,083,561 | 4/1978 | Daffer, Jr. . | |
| 4,258,923 | 3/1981 | Senoh | 473/478 |
| 4,653,142 | 3/1987 | Upton | 403/350 X |
| 4,664,384 | 5/1987 | Solla | 473/478 |
| 4,702,478 | 10/1987 | Kruse | 273/127 B |
| 4,786,053 | 11/1988 | Barnes, Jr. . | |
| 5,249,796 | 10/1993 | Silvi . | |
| 5,393,051 | 2/1995 | Merino et al. | 473/494 |
| 5,421,586 | 6/1995 | Amram et al. | 273/400 |
| 5,431,411 | 7/1995 | Padilla | 273/400 |
| 5,496,040 | 3/1996 | Amburgey et al. . | |
| 5,513,843 | 5/1996 | Russell . | |
| 5,533,733 | 7/1996 | Dirnbeck | 273/400 |
| 5,566,952 | 10/1996 | Mullin et al. | 273/400 |

Primary Examiner—William H. Grieb
Attorney, Agent, or Firm—Anthony R. Barkume

[57] ABSTRACT

A portable sporting goal is provided comprising a net that is removably attached by hook and loop connectors to strategic locations on a framework. The framework has a plurality of substantially hollow tubular frame members, each comprising a pair of ends comprising an inner surface. Each inner surface comprises a substantially cylindrical inner surface portion and a substantially non-cylindrical inner surface portion. The frame members are joined by a plurality of mating connectors, each comprising a pair of ends comprising an outer surface. Each outer surface comprises a substantially cylindrical outer surface portion and a substantially non-cylindrical outer surface portion. The outer surface is configured to slidingly engage within the inner surface when in substantial alignment with each other. At least one of the surfaces is made from a resilient material, so that the frame member is rotatable about the slidingly engaged mating connector such that the substantially non-cylindrical outer surface portion of the mating connector is not in substantial alignment with the substantially non-cylindrical inner surface portion of the tubular frame member, thereby increasing a frictional force between the tubular frame member inner surface and the mating connector outer surface. A plurality of hook and loop connecting means are affixed at various strategic locations to the framework. The net has a plurality of complementary hook and loop connecting means which are brought into close contact with the framework such that the complementary hook and loop connecting means mate, thereby substantially affixing said net to the framework.

23 Claims, 10 Drawing Sheets under 5,842,939

PORTABLE SPORTING GOAL FRAMEWORK AND NET

BACKGROUND OF THE INVENTION

This invention relates to a portable goal framework and net, and in particular to a portable sporting goal framework and net having interconnecting components that are easily assembled and disassembled.

Many of the games played throughout the world involve the use of a goal. The goal typically provides a well defined area into which a ball, puck or similar object must be propelled in order to advance the score of a team or player.

These games are played by those persons of every age and level of skill. Using hockey as an example, variations have evolved for application to streets and fields which require the use of a portable goal which can easily be assembled, collapsed and transported to and from the site of play. With this need for portability and ease of assembly comes the need for structural integrity once the goal has been assembled since the goal is required to withstand a great deal of force both from the propelled ball or puck and from players and their equipment. A goal net of the prior art described in U.S. Pat. No. 5,421,586, which is hereby incorporated by reference, discloses a net mounted on a portable support framework. The individual support members of this framework merely slide into mating connectors and, therefore do not provide a great deal of structural integrity once assembled due to the tendency of the support members and mating connectors to slide apart during the course of ordinary play. In addition, since this type of prior art framework utilizes mating components which can be press fit into each other in any rotational angle due to their cylindrical profiles, it is quite difficult to align properly the mating components during assembly. That is, it is easy to misalign the components whereby the various angles required to construct the framework are incorrect and the frame does not fit together properly.

Therefore, it would be advantageous to provide a portable goal having interconnecting components and which is relatively straightforward to assemble, collapse, and transport which at the same time presents a stable structure able to withstand rigorous play on a regular basis without the unintentional disconnection of components of the goal. In particular, it would be advantageous to provide a goal which comprises an interconnection mechanism which is relatively uncomplicated to engage, promotes proper mating connector alignment, inexpensive to manufacture, able to withstand numerous engagements, and is not subject to breakage or deformation during normal play.

The goal net described in the prior art of U.S. Pat. No. 5,421,586 provides a method of attaching the net to the frame comprising a stitched sleeve which is permanently sewn to the perimeter of the net and encases the components of the frame. For a number of reasons the typical user would desire to remove the net from the frame including but not limited to replacement, repair and ease of transport and assembly. Using the method of net attachment in the prior art such a removal would not be possible unless the elastic cord running through each of the frame components was cut. This would permit the sleeves of the net to be slipped over and off components of the framework. However, this would generally not be undertaken on a regular basis due to the additional number and complexity of steps involved. In addition, since the sleeves of the net in the method of the prior art are adapted to slide freely over the components of the framework the net provides little if any structural support to the assembled hockey goal framework.

Therefore, it would be advantageous to provide a goal comprising a net attachment method which would enable the regular removal of the net for ease in transport and assembly of the goal as well as repair, and replacement of the net. Also, an additional benefit could be obtained if such a net attachment method could simultaneously increase the structural integrity of the sporting goal framework by virtue of the attachment of the net.

SUMMARY OF THE INVENTION

A first major aspect of the present invention is a framework suitable for use as a sporting goal comprising a plurality of first interconnecting components, each comprising at least one end having a first cross-sectional profile comprising an inner surface; and a plurality of second interconnecting components, each comprising at least one end having a second cross-sectional profile comprising an outer surface. The outer surface of the second cross-sectional profile is configured to slidingly engage within the inner surface of the first cross-sectional profile when in substantial alignment therewith. At least one of the inner surface of the first cross-sectional profile and the outer surface of the second cross-sectional profile comprises a resilient material. The first and second interconnecting components are rotatable about each other after sliding engagement such that the first and second cross-sectional profiles are not in substantial alignment. Thus, a frictional force between the first interconnecting component inner surface and the second interconnecting component outer surface is increased.

In particular, the sporting goal framework comprises a plurality of substantially hollow tubular frame members and a plurality of mating connectors. Each of the tubular frame members comprises a pair of ends, each of the ends comprising an inner surface comprising a substantially cylindrical inner surface portion and a substantially non-cylindrical inner surface portion. Each of the mating connectors also comprises a pair of ends, each of the ends comprising an outer surface comprising a substantially cylindrical outer surface portion and a substantially non-cylindrical outer surface portion. The outer surface of the mating connector is configured to slidingly engage within the inner surface of the tubular frame member when the substantially non-cylindrical outer surface portion of the mating connector is in substantial alignment with the substantially non-cylindrical inner surface portion of the tubular frame member, wherein at least one of the inner surface of the tubular frame member and the outer surface of the mating connector comprises a resilient material. The tubular frame member is rotatable about the slidingly engaged mating connector such that the substantially non-cylindrical outer surface portion of the mating connector is not in substantial alignment with the substantially non-cylindrical inner surface portion of the tubular frame member, thereby increasing a frictional force between the tubular frame member inner surface and the mating connector outer surface. The plurality of substantially hollow tubular frame members and the plurality of mating connectors are arranged to form a framework suitable for use as a sporting goal.

In a second major aspect of the present invention, the sporting goal framework has a plurality of first connecting means affixed at various strategic locations thereto and a net is provided that comprises a plurality of second connecting means adapted to mate closely with the first connecting means, the second connecting means being brought into close contact with the framework such that the first and second connecting means mate, thereby substantially affixing the net to the framework. The first and second connecting means preferably comprise complementary hook and loop connecting means. In addition, the net may comprise a plurality of flaps affixed thereto, wherein the second connecting means is affixed to the plurality of flaps. Further, the first connecting means may be located on the framework such that the flaps may be wrapped substantially around the framework upon mating the first connecting means with the second connecting means.

DETAILED DESCRIPTION OF THE PREFERRED EMBODIMENT

Figure 1A:
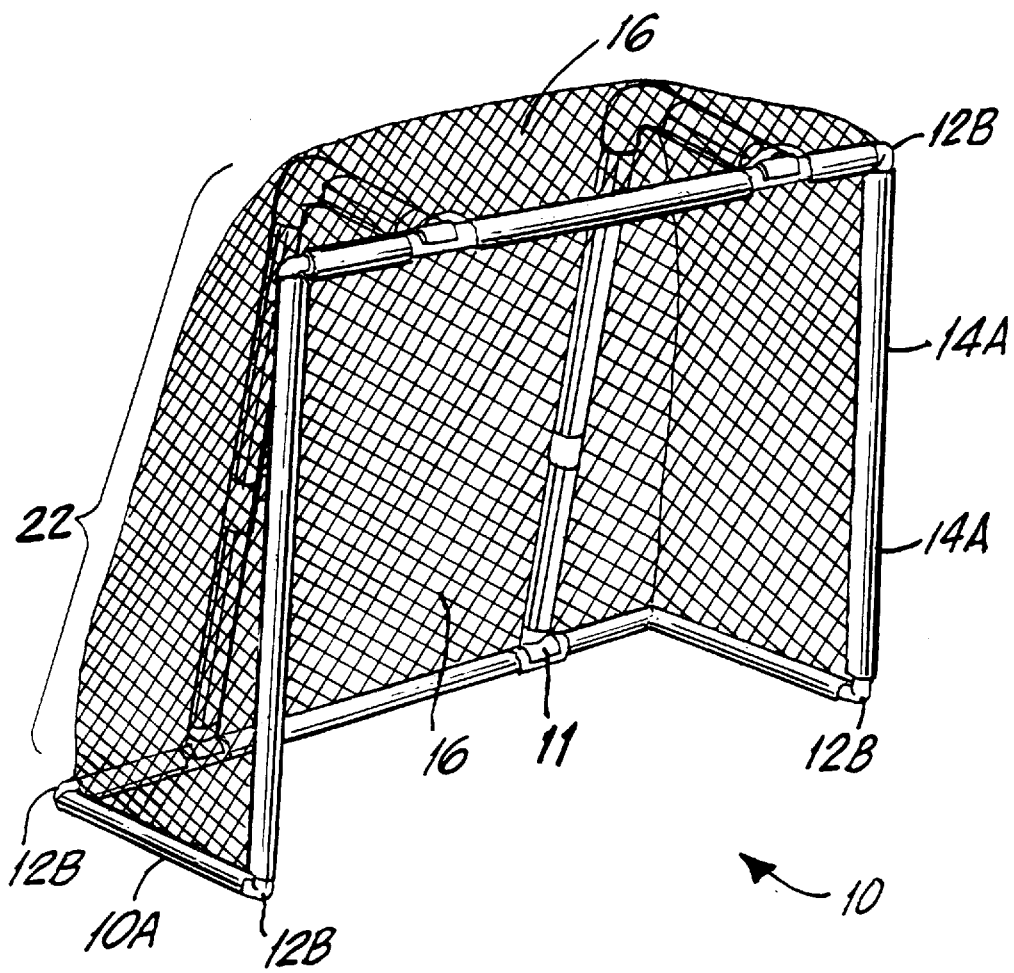
FIG. 1A illustrates a perspective view of the preferred embodiment portable sporting goal of the present invention.
Figure 1B:
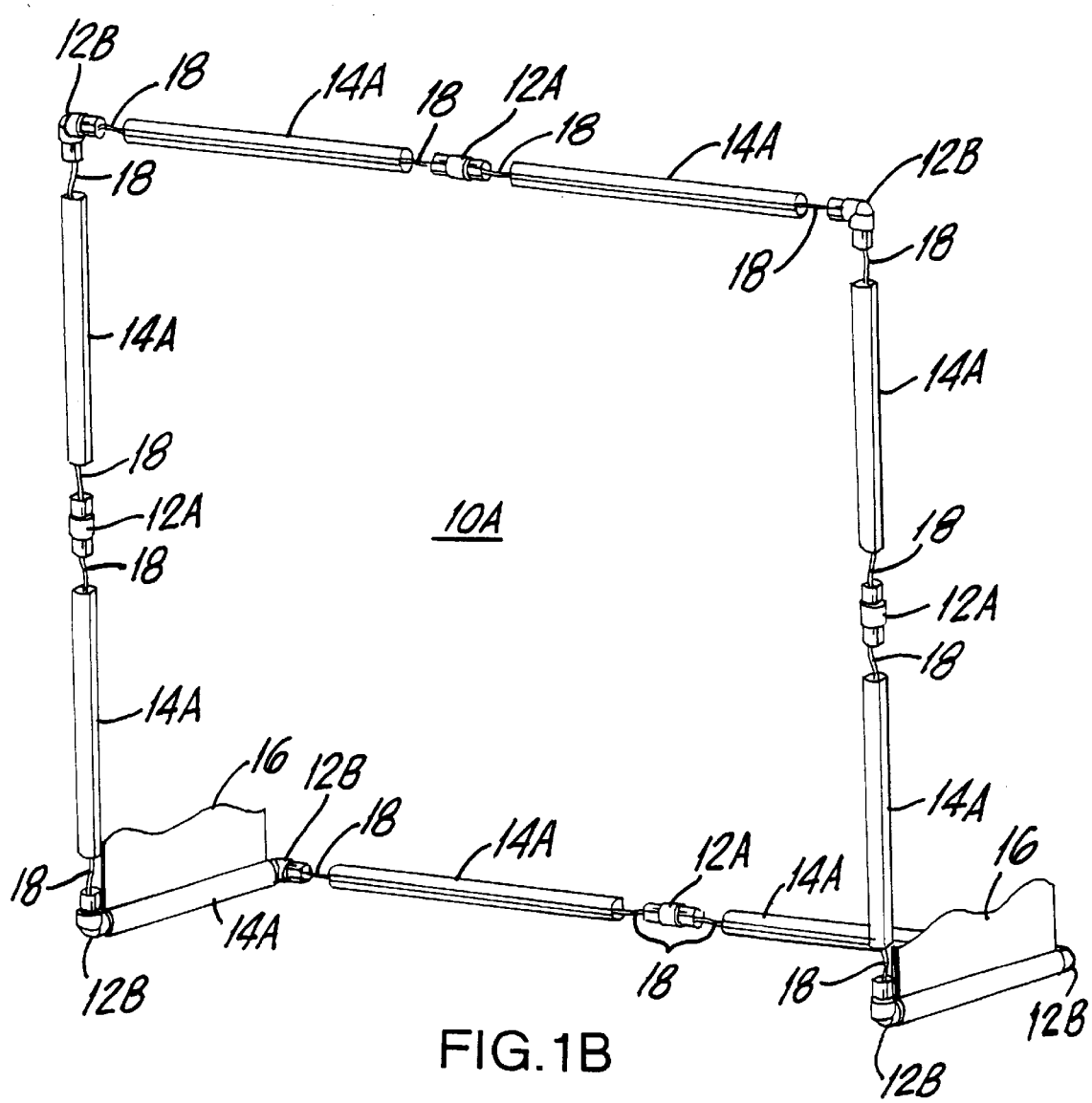
FIG. 1B illustrates a perspective, partially exploded view of the main frame of the portable sporting goal framework of FIG. 1 without upright support structures.

FIG. 1A illustrates the preferred embodiment of a portable sporting goal 10 of the present invention, which is suitable for use in hockey, and which comprises a framework 11 and a removably attached net 16. The framework 11 comprises a main frame 10A and a pair of support structures 22. The main frame 10A of the framework 11 is assembled from a plurality of interconnecting components as shown in FIG. 1B. The main frame 10A comprises a plurality of straight mating connectors 12A, a plurality of right angle mating connectors 12B, a plurality of substantially hollow tubular frame members 14A, and an elastic cord 18. The tubular frame members 14A are comprised of two ends, each of which are adapted to slidingly engage with an end of either the straight mating connector 12A or the right angle mating connector 12B and then rotate with respect to the mating connector end for a "twist and grip" interconnection as will be described in detail below. The elastic cord 18, typically a BUNGEE® cord or the equivalent, runs through a hollow portion of each of the straight mating connectors 12A, right angle mating connectors 12B, and tubular frame members 14A in order to form a continuous loop so that components of the portable sporting goal main frame 10A cannot be completely uncoupled from one another when in a disassembled or collapsed state. While adjoining interconnecting components (mating connectors and tubular frame components) of the main frame can be uncoupled so that the connections are no longer rigid, a flexible connection is retained due to the presence of the elastic cord 18 in order to retain adjacent components in the proper arrangement and thus facilitate assembly of the portable sporting goal main frame 10A.

Figure 2A:
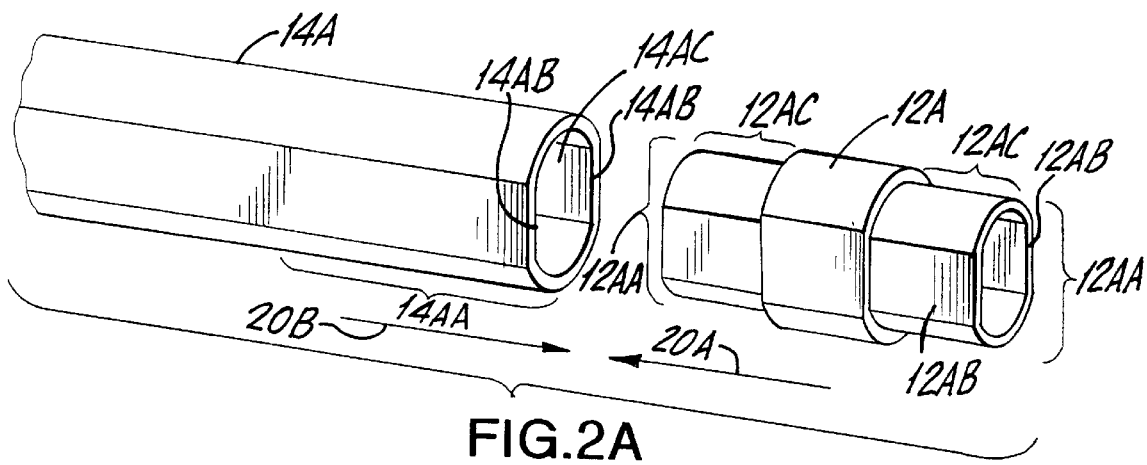
FIGS. 2A and 2B illustrate perspective views of the interconnection method of the present invention shown with respect to a tubular frame member and a straight mating connector.

A unique "twist and grip" mechanism interconnects the components (mating connectors and frame members) of the portable sporting goal 10 in the present invention. As shown in FIG. 2A, the tubular frame member 14A is substantially cylindrical and comprised of two open ends 14AA (only one being shown), an inner surface 14AC, and one or more substantially non-cylindrical (i.e. flat or planar) inner surface portions 14AB which occupy a portion of the inner surface 14AC of the tubular frame member 14A. Each of the framework components (i.e., the tubular frame member 14A, the straight mating connector 12A, the right angle mating connector 12B, a 107-degree mating connector 12C, and a C-shaped mating connector 12D) are typically manufactured from a resilient and semi-rigid material such as plastic, polypropylene, acrylic, latex or the equivalent. The straight mating connector 12A has two open ends 12AA, an outer surface 12AC and one or more substantially non-cylindrical (i.e. flat or planar) outer surface portions 12AB located along the outer surface 12AC of the straight mating connector 12A. The dimensions and cross-sectional profile of the open end 12AA of the straight mating connector 12A and the location of the substantially non-cylindrical outer surfaces 12AB are such that the open end 12AA of the straight mating connector 12A can readily be aligned with and slidingly inserted into the open end 14AA of the tubular frame member 14A when the substantially non-cylindrical outer surfaces 12AB of the straight mating connector 12A are substantially in registration with the substantially non-cylindrical inner surfaces 14AB of the tubular frame member 14A. Although the cross-sectional profiles of the frame member inner surface 14AC and the mating connector outer surface 12AC need not match exactly, they do need to be in substantial conformity so that sliding engagement may be achieved with relative ease. For example, the non-cylindrical inner surface portion 14AB may be slightly convex rather than planar, yet still be alignable with a non-cylindrical outer surface portion 1AB that is planar.

Each of the mating connectors has a tubular body portion disposed between the pair of ends, with a circumference substantially equal to a circumference of each of the tubular frame members. Each of the mating connectors also has a shoulder 13 disposed between each of the ends and the tubular body portion, which is adapted for adjacent positioning with the associated tubular frame member upon assembly of the framework.

Figure 2B:
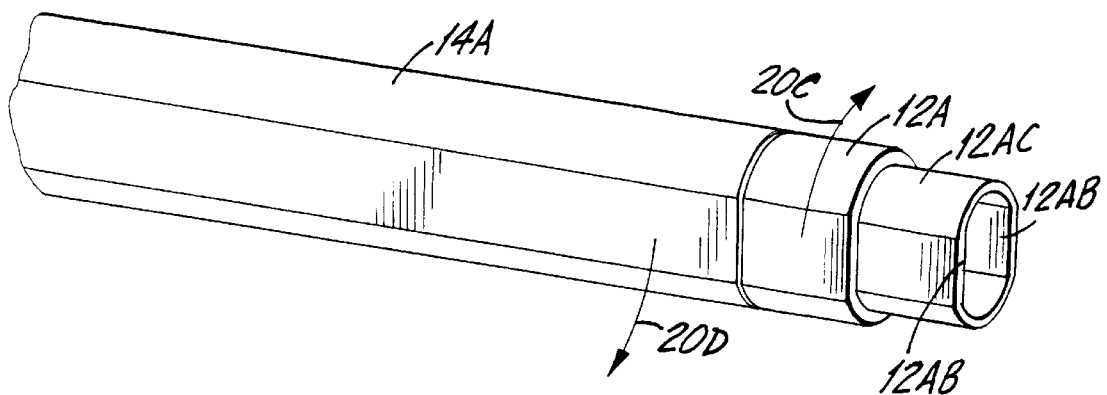
Figure 3A:
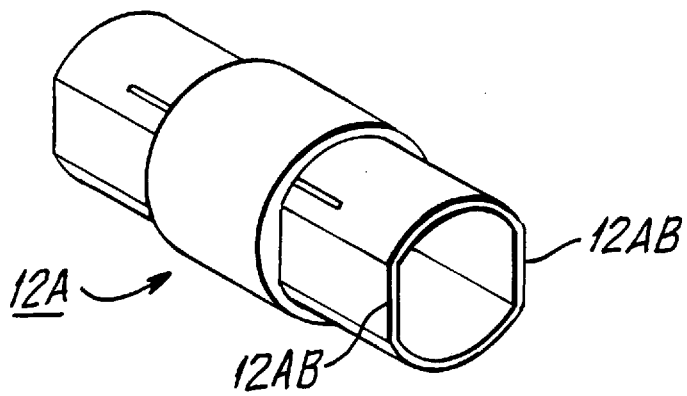
FIGS. 3A, 3B, and 3C illustrate perspective views of the straight mating connector, a 107-degree mating connector and a right angle mating connector, respectively, of the present invention.
Figure 3B:
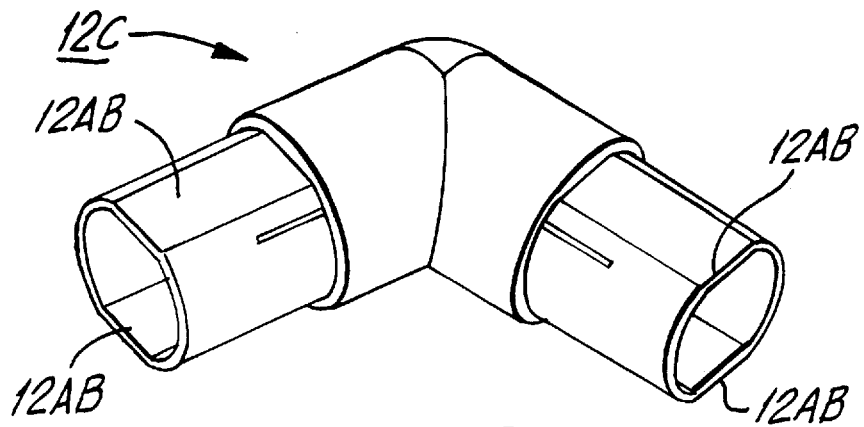
Figure 3C:
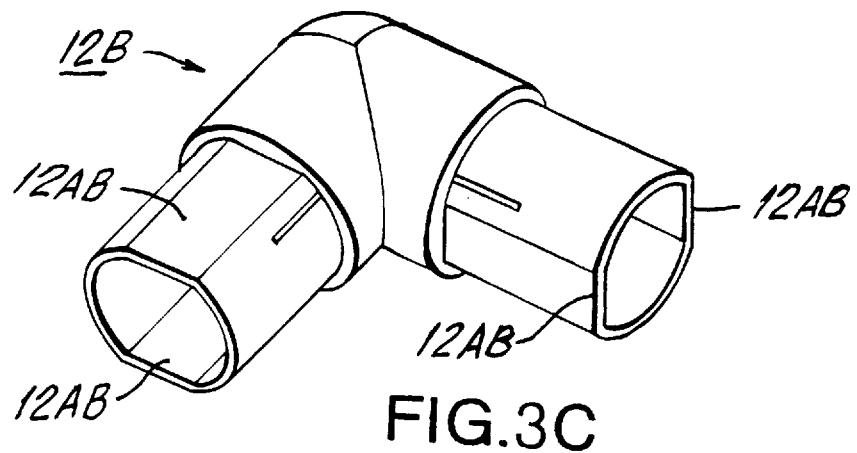

Once slidingly engaged with each other in this manner (i.e. in the direction as shown by arrows 20A and 20B in FIG. 2A), there should be a minimum amount of play between the two components which will permit rotation of the two components with respect to each other. The straight mating connector 12A is rotated with respect to the tubular frame member 14A, as shown by the arrows 20C and 20D in FIG. 2B (rotation may be in either the clockwise or counterclockwise direction), which results in temporary deformation of one or both components' mating surface areas in order to permit such a rotation; hence the need for a resilient and semi-rigid material in the construction of one or both components. Once the rotational action is terminated, one or both of the frame components (i.e., the tubular frame member 14A and the straight mating connector 12A) will tend towards regaining their original non-deformed shape and in so doing will exert forces substantially against the opposing mating surface. These forces will tend to increase the frictional force between the tubular frame member 14A and the straight mating connector 12A should the attempt be made to separate the two members by laterally sliding the components away from each other rather than by rotation back to the original position. The cylindrical portions of the inner surface 14AC and the outer surface 12AC facilitate rotation of the interconnecting components with respect to each other, while the non-cylindrical portions facilitate gripping between the surfaces of the interconnecting components after rotation. Thus, an interconnection mechanism is created which resists lateral separation of the straight mating connector 12A from the tubular frame member 14 due to the increased frictional ("gripping") force between the two members no longer being in registration. The description given above with respect to the method of interconnection between the tubular frame member 14A and the straight mating connector 12A applies equally to the method of interconnection between the tubular frame member 14A and the right angle mating connector 12B, the 107-degree mating connector 12C or the C-shaped mating connector 12D as shown in FIGS. 3A, 3B, 3C, and 5. Conversely, an embodiment in which the tubular frame member 14A is adapted to insert into any of the mating connectors 12A-D, rather than vice-versa as described above, is envisioned to be well within the scope of the invention.

Figure 4:
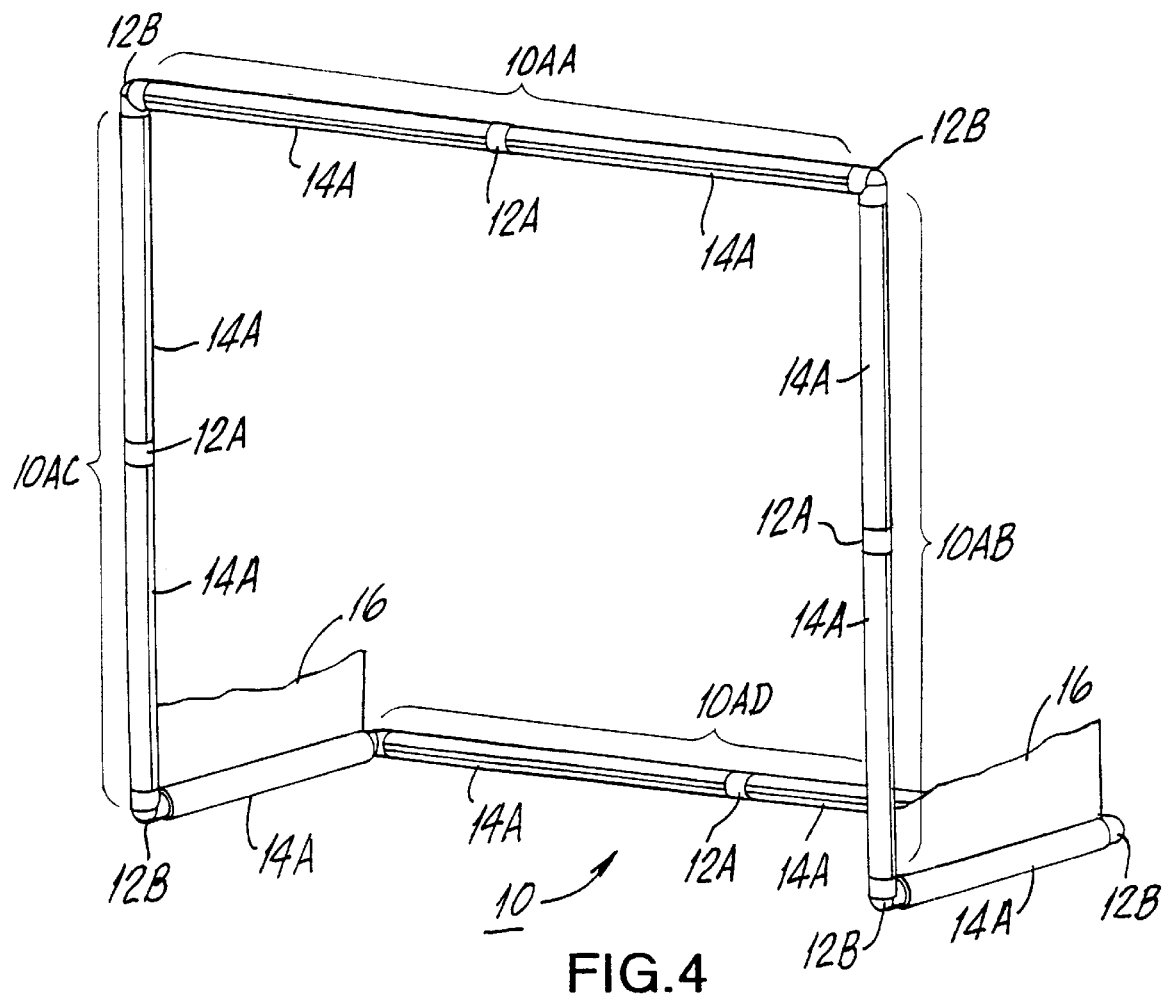
FIG. 4 illustrates a perspective view of the portable sporting goal framework of Fig.1B in an assembled state, without upright support structures.

Referring back to FIG. 1B, each of the plurality of tubular frame members 14A and straight mating connectors 12A as well as right angle mating connectors 12B, 107-degree mating connectors 12C, and C-shaped mating connectors 12D are interconnected with the tubular frame members 14A via the interconnection method described above. As shown in FIG. 4, two tubular frame members 14A are interconnected using the straight mating connector 12A between them and employed as a top section 10AA, as a right side section 10AB, as a left side section 10AC, and as a back brace section 10AD of the portable sporting goal 10. The top 10AA, right side 10AB, and left side 10AC sections are then interconnected to each other using two right angle mating connectors 12B. The as yet unconnected ends of each of the tubular frame members 14A of the right side 10AB and left side 10AC sections are then interconnected to another tubular frame member 14A via another right angle mating connector 12B. The unconnected end of these frame members 14A are then interconnected to the back brace section 10AD with two additional right angle mating connectors 12B. The elastic cord 18 is constructed as a single loop (e.g. by tying the ends together in some convenient manner after threading through each component of the frame) and functions to guide the assembly of the portable sporting goal main frame 10A while ensuring that adjacent components will be interconnected as such during assembly. The portable sporting goal main frame 10A is shown assembled in FIG. 4.

Figure 5:
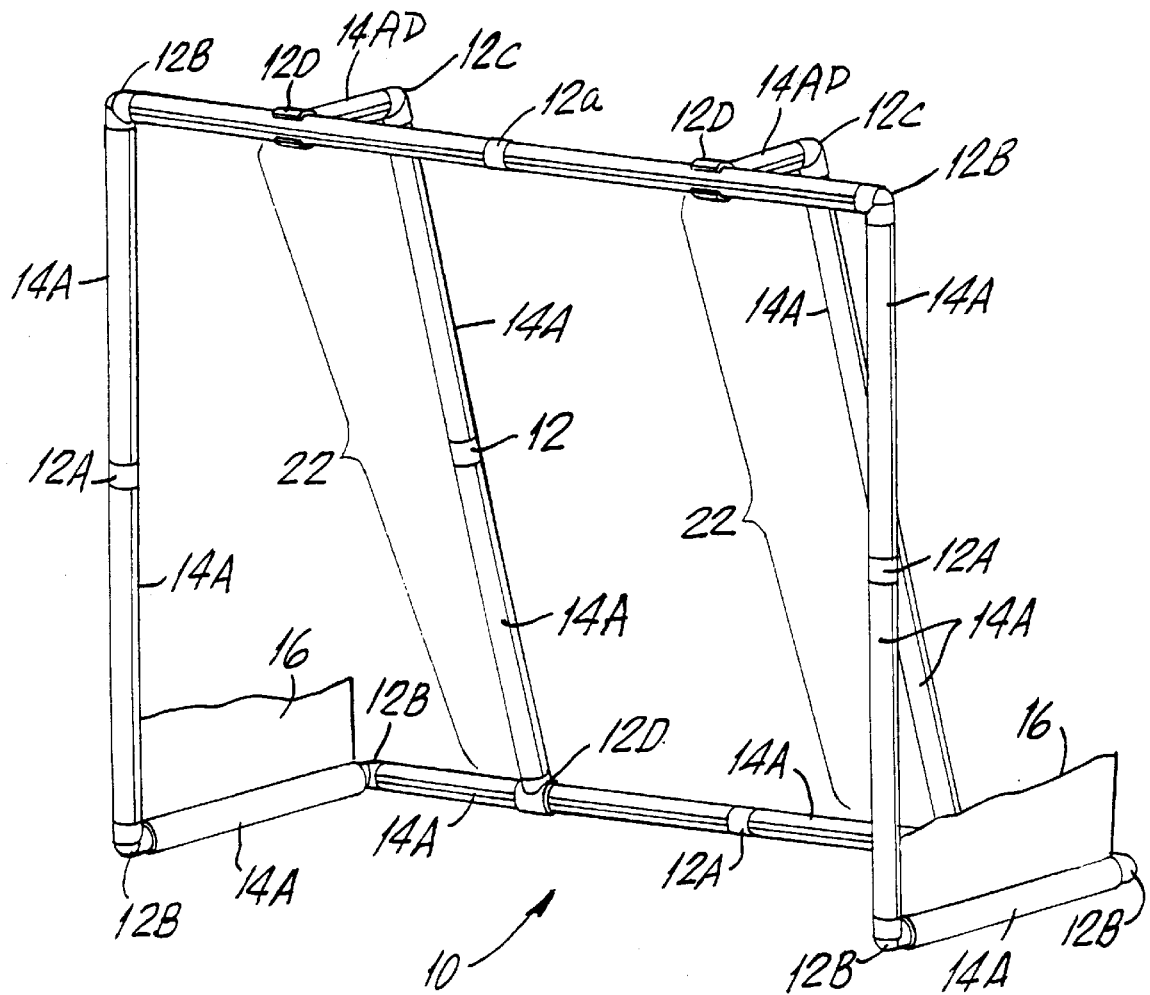
FIG. 5 illustrates a perspective view of the portable sporting goal framework of FIG. 1A in an assembled state.

The fully assembled portable sporting goal 10 comprising a pair of upright support structures 22 is shown assembled in FIG. 5. Each upright support structure 22 is comprised of two C-shaped mating connectors 12D, one end of which is interconnected via the twist and grip interconnection method of the present invention to one tubular frame member 14A which is then interconnected to another tubular frame member 14A via a straight mating connector 12A. One end of the 107-degree mating connector 12C interconnects via the interconnection method of the present method to an open end of the tubular frame member 14A and the other as yet unconnected end of the 107-degree mating connector 12C interconnects with a short tubular frame member 14AD which is then stabilized against the top section 10AA of the portable sporting goal 10 via interconnection with another C-shaped mating connector 12D. One each of the C-shaped mating connectors 12D of the upright support structure 22 clamp over either the top section 10AA or back brace section 10AD of the portable sporting goal 10 substantially anywhere along the length of these sections since, unlike the remaining components of the portable sporting goal main frame 10A, the upright support structures 22 do not comprise an elastic cord 18 running along the inside of its components. However, an elastic cord could optionally extend through the upright support structures 22 being the same as or different from that which passes through the portable sporting goal main frame 10A and still be within the scope of the present invention as envisioned.

Figure 6A:
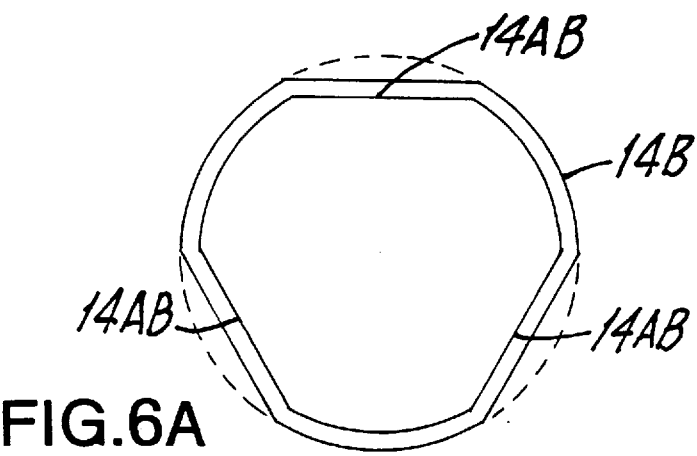
FIGS. 6A, 6B, and 6C illustrate end views of three alternative variations of the tubular frame member of the present invention.
Figure 6B:
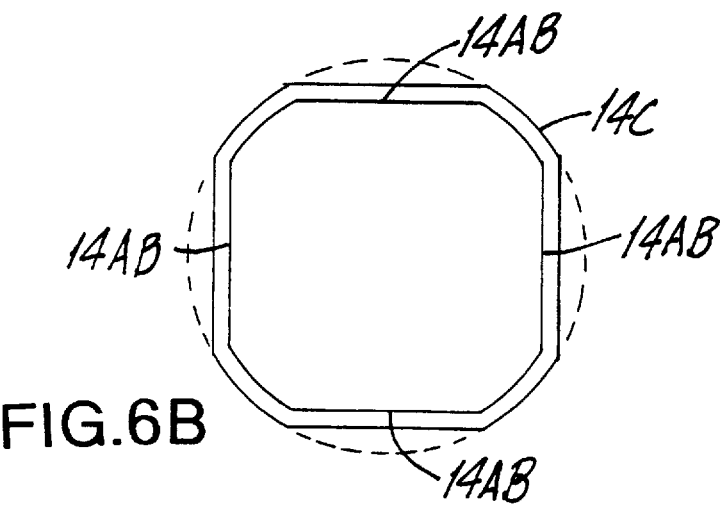
Figure 6C:
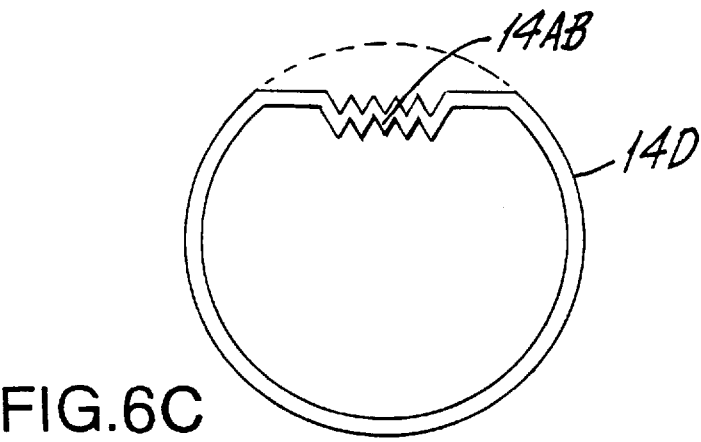

FIGS. 6A, 6B, and 6C illustrate end views of three additional embodiments of the tubular frame member 14A comprising three, four and one substantially non-cylindrical inner surfaces 14AB per tubular frame member at reference numerals 14B, 14C, and 14D, respectively. In addition, the substantially non-cylindrical inner surfaces 14AB need not extend the entire length of the tubular frame member 14B–D as shown by the dotted lines which arc over the substantially non-cylindrical inner surfaces 14AB in each of the different embodiments shown in FIGS. 6A, 6B, and 6C. Naturally, the range of variations in shape for the tubular frame members and matching mating connectors is potentially limitless and those illustrated are intended only as examples and not as limitations for the present invention. In addition, the substantially non-cylindrical sections may comprise ridges as shown in FIG. 6C. Each of the different embodiments illustrated would preferably have a substantially similar mating profile in the corresponding mating connectors 12A, 12B, 12C, or 12D (not shown) in order to allow easy sliding engagement for the twist and grip interconnection method of the present invention.

Thus, the present invention utilizes the ability of the mating connectors to be slidingly engaged within an associated tubular frame member with relative ease when properly aligned, yet when rotated such that the components are no longer aligned, the components will exhibit an increased frictional force between mating surfaces such that the components cannot be readily removed by attempted lateral sliding, and in order to effect removal of the components, they must be rotated back to the original position of alignment and decreased frictional force therebetween. The unique twist-and-grip feature of the present invention provides additional advantages that aid in easy alignment of the interconnecting components of the goal 10. By requiring the user to first align the substantially mating profiles of the connectors 12A, 12B or 12C with the associated frame members 14A, proper alignment of the overall shape of the goal 10 is easily achieved. In distinction, the completely cylindrical mating shapes of prior art goals may be pushed together in any relative rotational position with each other; thus there is no natural tendency for the overall framework to be aligned as in the present invention. That is, once the profiles are properly mated in the present invention, the entire framework is already substantially in alignment and the assembly may be completed with ease.

Figure 7:
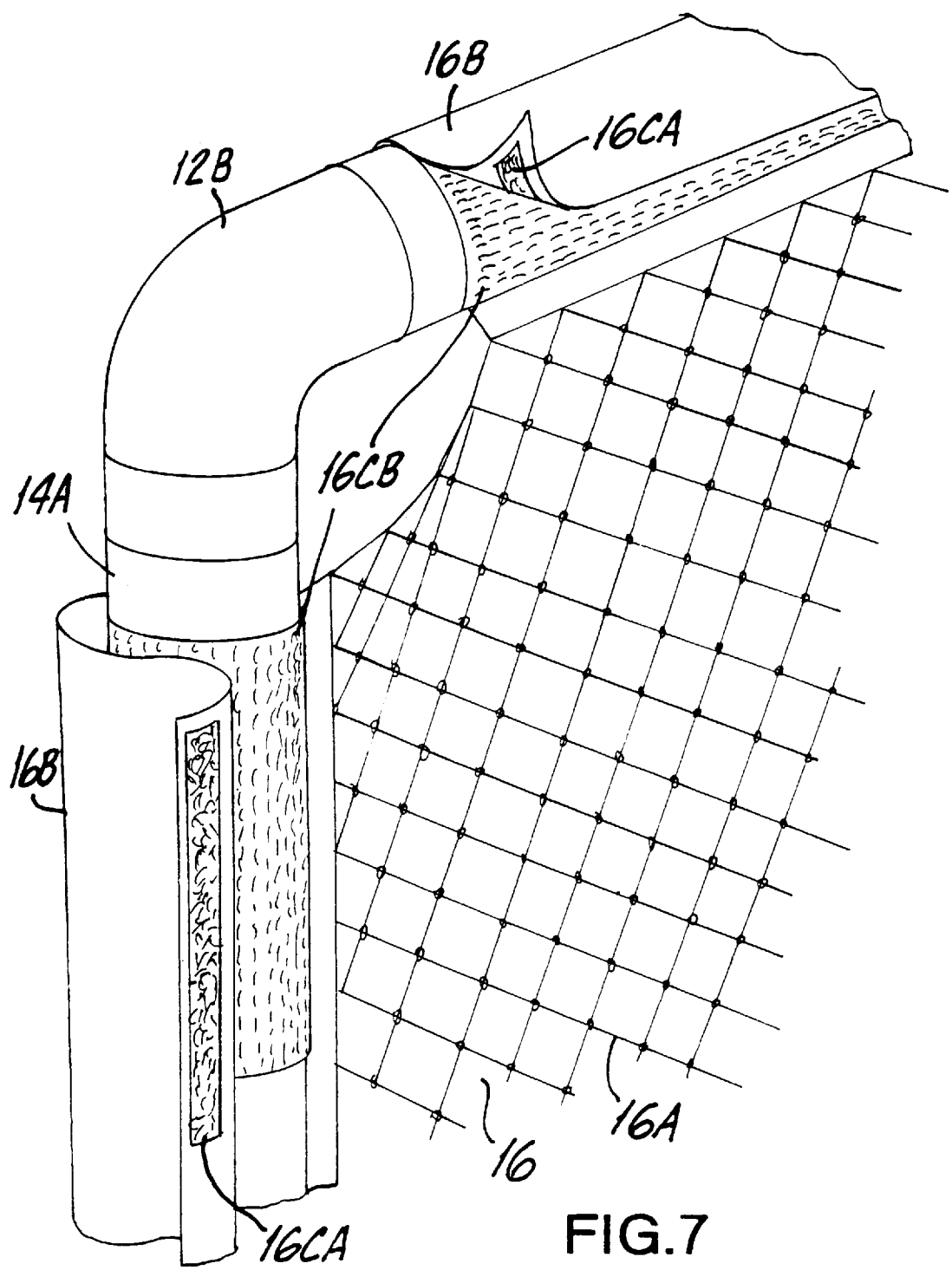
FIG. 7 illustrates a perspective view of the preferred embodiment net attached to the framework of the portable sporting goal of the present invention.
Figure 8:
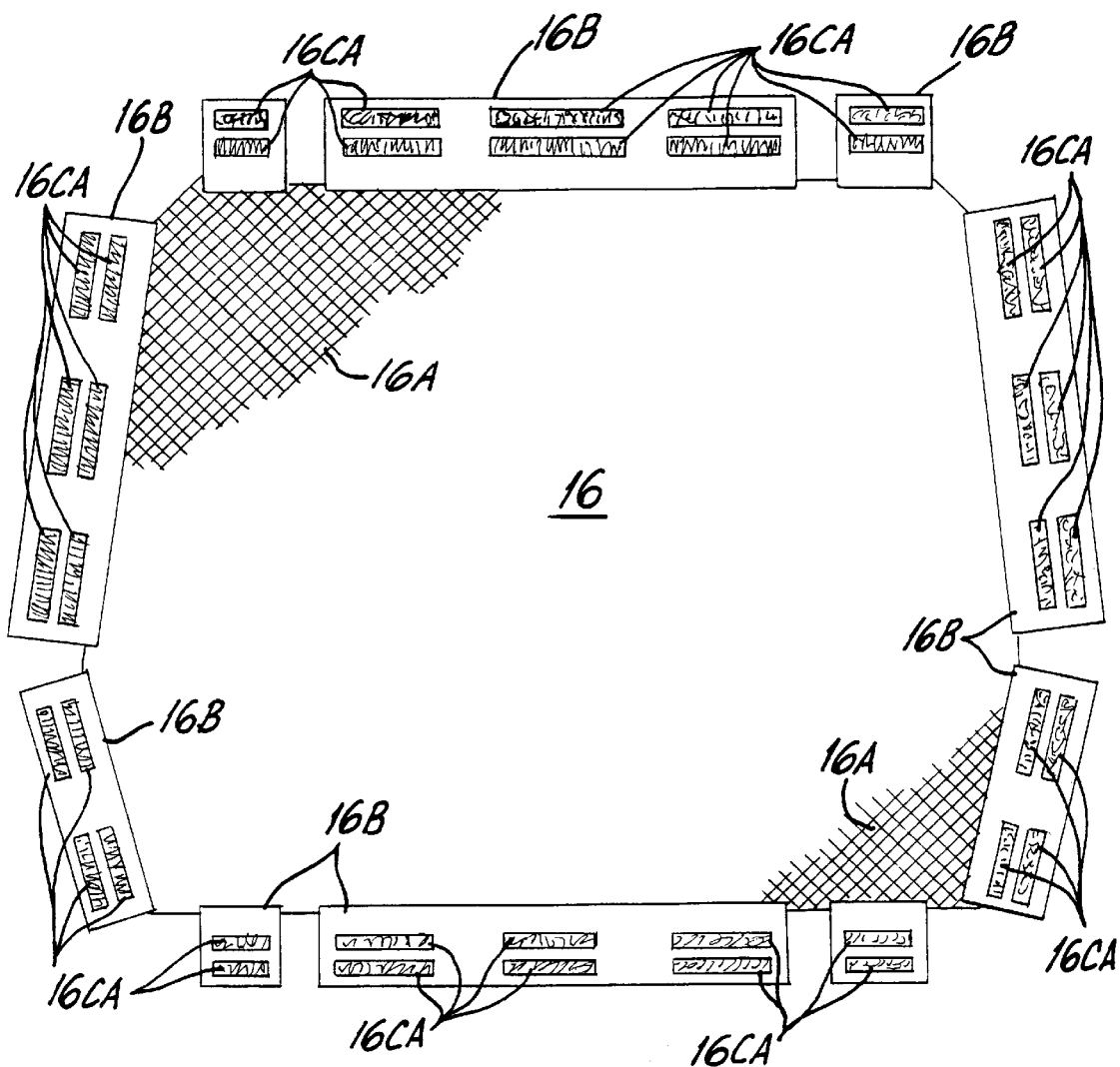
FIG. 8 illustrates a back view of the preferred embodiment net unattached to the framework of the portable sporting goal of the present invention.

FIGS. 7 and 8 illustrate the net 16 of the portable sporting goal of the preferred embodiment of the present invention.

The net 16 is comprised of mesh 16A which is flexible and durable, and is comprised of a material sufficiently strong enough to withstand the force of an object such as a hockey puck impelled against it. The mesh 16A is sized to fit the main frame of the assembled portable sporting goal with an additional material which provides a pocket draped behind the portable sporting goal 10 as shown in FIG. 1A. Stitched to the edges of the net 16 are flaps 16B comprised of a flexible material, preferably a fine net or mesh of flexible plastic or nylon. The flaps 16B are intended to meet at a number of strategic locations on the various components of the main frame at which point a connector means such as a pair of hook and loop connectors (e.g. VELCRO) 16CA will be stitched or affixed to the flap 16B and a complementary hook and loop connector 16CB will be affixed to a corresponding location on the portable sporting goal main frame 10A in order to enable the net 16 to be securely yet removably fastened to the main frame. As illustrated in FIG. 7, the flap 16B substantially encircles components of the main frame, however, such a wraparound technique is not required for the present invention and is intended only as an example. The hook and loop connector 16CA of the flap 16B could as well merely meet the hook and loop connector 16CB affixed to the main frame, although this would probably not create as rugged a means of fastening the net 16 to the main frame as the wraparound technique would provide. The hook and loop connector 16CB is shown in FIG. 7 extending substantially around the perimeter of the frame members such that attachment with a corresponding hook and loop connector 16CA is facilitated with ease. Of course, the hook and loop connector 16CB need not extend substantially around the frame member; it may be a narrower strip strategically located for proper mating. It is envisioned that the flaps 16B will extend substantially along the entire perimeter of the net and that hook and loop connectors 16CA will be affixed at as many locations along the flaps 16B as required for the particular application as shown in FIG. 8. This method of attachment permits the uncomplicated and reliable attachment and detachment of the net 16 to the main frame which is suitable for all ages of players. In addition, this method permits the complete removal of the net 16 should the net be in need of repair, long term storage or replacement. It has also been found to be advantageous to interconnect the various components of the main frame without having the net 16 attached since during the assembly phase the net would likely become trapped between adjacent main frame components during interconnection. In addition, by attaching the various portions of the net directly to the associated portions of the framework, increased structural stability of the entire structure results in stark contrast to the sliding net sleeves taught by the prior art.

FIG. 8 illustrates the preferred embodiment of the net 16 in an unattached state and stretched substantially flat. The mesh 16A, although only partially illustrated, extends across substantially the entire area of the net 16. The flaps 16B are sewn or otherwise attached along the perimeter of the net 16 and pairs of hook and loop connectors 16CA are affixed to the flaps 16B in order to mate with complementary hook and loop connectors 16CB located along the main frame of the portable sporting goal according to the method illustrated in FIG. 7. Although the preferred embodiment illustrates the use of pairs of identical hook and loop connectors 16CA, single connectors in varying shapes may also be used if convenient.

Figure 9:
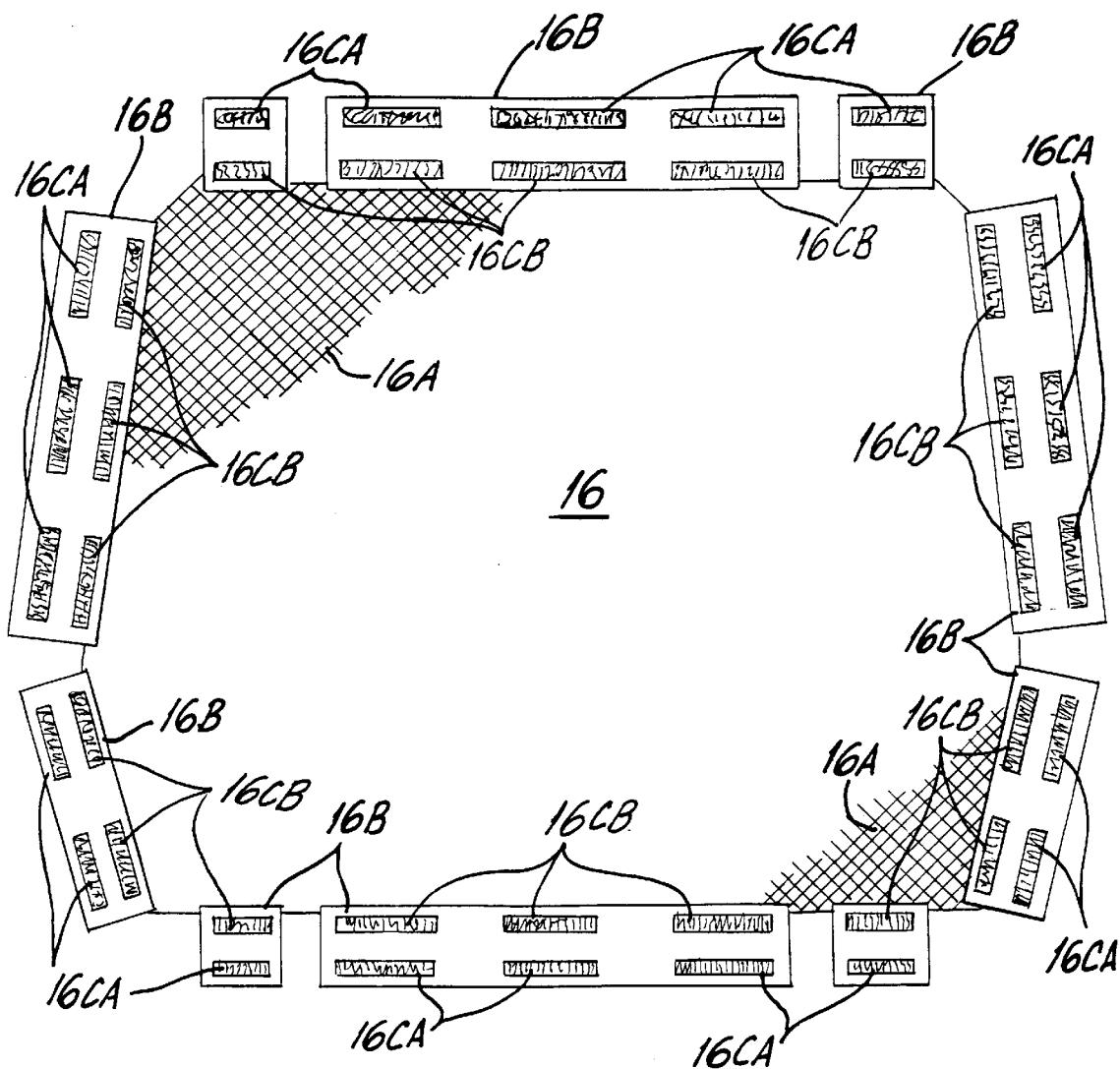
FIG. 9 illustrates an alternative embodiment net unattached to the framework of the portable sporting goal of the present invention.

Optionally, the complementary hook and loop connectors 16CB may be affixed on the flaps 16B substantially in parallel to the hook and loop connectors 16CA (on either side of the flap), rather than affixed to the frame members of the goal, as shown in FIG. 9. In this embodiment, the flaps wrap around the frame members and the hook and loop connectors 16CA and 16CB are pressed together to form a temporary yet stable "sleeve" around the frame member. Although the frame in this embodiment does not gain the structural benefit as when the flaps are joined directly to the frame members, the sleeve may be formed in assembly by the user so as to be fairly snug around the members and provide nearly the same result. This embodiment may be advantageous in manufacturing since the frame members need not be provided with the connectors 16CB.

In an additional embodiment, one or more of the flaps may be formed as a complete and permanent sleeve for sliding over an associated frame member 14A. By having at least one permanent sleeve always encasing at least one frame member, the user is provided with a repeatable starting point for assembly of the goal. This will help the user attach the rest of the net by having this permanent reference point of assembly. However, this embodiment does not allow the user to completely remove the net 16 from the goal if desired (due to the presence of the elastic cord).

In either of these two alternative embodiments, the inner portion of the sleeve (or sleeves) that encase the frame members may optionally be provided with one or more additional hook and loop connecting means, and the associated frame member surface may be likewise provided with a complementary hook and loop connecting means, so that the sleeve may be fastened temporarily to the associated frame member in order to help keep it aligned with the frame. As such, the sleeve portion or portions will not easily slide with respect to the frame members, thus providing increased structural stability as with the preferred embodiment method of wrapping the flaps around the frame members. The user advantageously maintains a reference point for attaching the remaining (non-sleeved) portions of the net, yet the sleeve can be slid off of the frame member by detaching the hook and loop means when desired.

The preferred embodiment of the present invention has been described with reference to a goal suitable for use in hockey, but is equally applicable to goals used on other sports such as soccer or water polo, merely by changing the relative size and shape of the framework and associated net to accommodate the various sports' requirements.

While various changes and modifications may be made in the detailed description and construction provided, it is understood that such changes or modifications will be within the spirit and scope of the present invention, as it is defined by the appended claims.

What is claimed is:

1. A sporting goal framework comprising:
    a plurality of substantially hollow tubular frame members, each of said tubular frame members comprising a pair of ends, each of said ends comprising an inner surface comprising a substantially cylindrical inner surface portion and a substantially non-cylindrical inner surface portion;
    a plurality of mating connectors, each of said mating connectors comprising a pair of ends, each of said ends comprising an outer surface comprising a substantially cylindrical outer surface portion and a substantially non-cylindrical outer surface portion, said outer surface of said mating connector configured to slidingly engage within said inner surface of said tubular frame member when said substantially non-cylindrical outer surface portion of said mating connector is in substantial alignment with said substantially non-cylindrical inner surface portion of said tubular frame member, wherein at least one of said inner surface of said tubular frame member and said outer surface of said mating connector comprises a resilient material;

said tubular frame member being rotatable about said slidingly engaged mating connector such that said substantially non-cylindrical outer surface portion of said mating connector is not in substantial alignment with said substantially non-cylindrical inner surface portion of said tubular frame member, thereby increasing a frictional force between said tubular frame member inner surface and said mating connector outer surface;

said plurality of substantially hollow tubular frame members and said plurality of mating connectors being arranged to form a framework.

2. The sporting goal framework of claim 1, wherein said substantially non-cylindrical inner surface portion of each of said tubular frame members is substantially planar, and wherein said substantially non-cylindrical outer surface portion of each of said mating connectors is substantially planar.

3. The sporting goal framework of claim 1, wherein said substantially non-cylindrical inner surface portion of each of said tubular frame members comprises a pair of oppositely disposed substantially non-cylindrical surfaces, and wherein said substantially non-cylindrical outer surface portion of each of said mating connectors comprises a pair of oppositely disposed substantially non-cylindrical surfaces.

4. The sporting goal framework of claim 1, wherein said plurality of mating connectors comprises a plurality of straight mating connectors and a plurality of angled mating connectors.

5. The sporting goal of claim 1, wherein each of said mating connectors comprises a tubular body portion disposed between said pair of ends of said mating connector, said tubular body portion having a circumference substantially equal to a circumference of each of said tubular frame members, each of said mating connectors further comprising a shoulder disposed between each of said ends and said tubular body portion adapted for adjacent positioning with said tubular frame members upon assembly of said framework.

6. A sporting goal framework comprising:
a plurality of mating connectors, each comprising an outer surface, wherein a substantially non-cylindrical outer surface occupies a portion of said outer surface; and
a plurality of tubular frame members, each comprising an inner surface, wherein a substantially non-cylindrical inner surface occupies a portion of said inner surface, said outer surface adapted to mate with said inner surface when placed substantially in registration with each other, said inner surface adapted to grip against said outer surface when said mating connector is rotated with respect to said tubular frame member causing said substantially non-cylindrical inner and outer surfaces to be no longer in substantial registration with each other, whereby a frictional force which resists separation of said mating connector and said tubular frame member is increased.

7. The sporting goal framework of claim 6, further comprising a plurality of substantially non-cylindrical inner and outer surfaces, said plurality of substantially non-cylindrical inner surfaces positioned such that said plurality of substantially non-cylindrical outer surfaces may be placed in registration with said plurality of substantially non-cylindrical sections when said mating connector is interconnected with said tubular frame member.

8. The sporting goal framework of claim 6, wherein said substantially non-cylindrical inner and outer surfaces are substantially flat.

9. The sporting goal framework of claim 6, wherein said substantially non-cylindrical inner and outer surfaces occupy a substantially large area of said inner and outer surfaces, thereby facilitating placement of said substantially non-cylindrical inner and outer surfaces in registration with each other.

10. The sporting goal framework of claim 6, wherein said tubular frame member is manufactured from a resilient material adapted to permit temporary deformation of said tubular frame member when engaged with and rotated with respect to said mating connector.

11. The sporting goal framework of claim 6, wherein said mating connector is manufactured from a resilient material adapted to permit temporary deformation of said mating connector when engaged with and rotated with respect to said mating connector.

12. The sporting goal framework of claim 6, wherein said tubular frame member and mating connector are flexibly interconnected by an elastic cord, said elastic cord maintaining connection between adjacent mating connectors and tubular frame members when said sporting goal framework is in a collapsed state.

13. The sporting goal framework of claim 6, wherein said mating connector has a C-shaped end adapted to clamp substantially perpendicular to a longitudinal axis and around an external surface of a tubular frame member.

14. The sporting goal framework of claim 6, wherein said mating connector is adapted to interconnect tubular frame members at a predetermined angle.

15. The sporting goal framework of claim 6, wherein said substantially non-cylindrical sections comprise ridges.

16. A portable sporting goal comprising:
a framework comprising a plurality of tubular frame members interconnected by mating connectors, said mating connectors comprising an outer surface, a substantially non-cylindrical outer surface located on said outer surface, and a non-deformed shape, said tubular frame members being substantially cylindrical and comprising an inner surface, a longitudinal axis, a substantially non-cylindrical inner surface located on said inner surface, and a non-deformed shape, said outer surface adapted to mate with said inner surface when said substantially non-cylindrical inner and outer surfaces are substantially in registration with each other, said inner surface adapted to grip against said outer surface when said tubular frame member is rotated about said longitudinal axis with respect to said mating connector causing said substantially non-cylindrical inner and outer surfaces to no longer be in registration with each other, whereby a frictional force which resists separation of said mating connector and said tubular frame member is increased; and wherein a plurality of first connecting means are affixed at various strategic locations to said framework; and
a net comprising a plurality of second connecting means adapted to mate closely with said first connecting means, said second connecting means being brought into close contact with said framework such that said first and second connecting means mate, thereby substantially affixing said net to said framework.

17. The portable sporting goal of claim 16, wherein said tubular frame members and mating connectors are coupled by an elastic cord which maintains connection between adjacent mating connectors and tubular frame members when said sporting goal is in a collapsed state.

18. The portable sporting goal of claim 16, wherein said mating connector is adapted to interconnect tubular frame members at a predetermined angle.

19. The portable sporting goal of claim 16, wherein said substantially non-cylindrical sections are substantially flat.

20. The sporting goal of claim 16, wherein said substantially non-cylindrical sections comprise ridges.

21. A kit of parts for a sporting goal comprising:

a framework comprising a plurality of tubular frame members interconnected by a plurality of mating connectors, said mating connectors comprising an outer surface, a substantially non-cylindrical outer surface located on said outer surface, and a non-deformed shape, said tubular frame members comprising an inner surface, a longitudinal axis, a substantially non-cylindrical inner surface located on said inner surface, and a non-deformed shape, said outer surface adapted to mate with said inner surface when said substantially non-cylindrical inner and outer surfaces are substantially in registration with each other, said inner surface adapted to grip against said outer surface when said tubular frame member is rotated about said longitudinal axis with respect to said mating connector causing said substantially non-cylindrical inner and outer surfaces to no longer be in registration with each other, whereby a frictional force which resists separation of said mating connector and said tubular frame member is increased; and wherein a plurality of first connecting means are affixed at various strategic locations to said framework; and a net comprising a plurality of second connecting means adapted to mate closely with said first connecting means, said second connecting means being brought into close contact with said framework such that said first and second connecting means mate.

22. The kit of parts of claim 21, further comprising an upright support structure comprising said tubular frame members interconnected by said mating connectors, said upright support structure adapted to span across an area occupied by said net.

23. A framework comprising:

a plurality of first interconnecting components, each comprising at least one end comprising an inner surface, said inner surface comprising a substantially cylindrical inner surface portion and a substantially non-cylindrical inner surface portion; and a plurality of second interconnecting components, each comprising at least one end comprising an outer surface, said outer surface comprising a substantially cylindrical outer surface portion and a substantially non-cylindrical outer surface portion, said outer surface of said second interconnecting component configured to slidingly engage within said inner surface of said first interconnecting component when said substantially non-cylindrical outer surface portion is in substantial alignment with said substantially non-cylindrical inner surface portion, wherein at least one of said inner surface of said first interconnecting component and said outer surface of said second interconnecting component comprises a resilient material;

said first and second interconnecting components being rotatable about each other after said sliding engagement such that said substantially non-cylindrical outer surface portion of second interconnecting component is not in substantial alignment with said substantially non-cylindrical inner surface portion of said first interconnecting component, thereby increasing a frictional force between said first interconnecting component inner surface and said second interconnecting component outer surface.

\* \* \* \* \*